US009648304B2

United States Patent
Ohtomo et al.

(10) Patent No.: US 9,648,304 B2
(45) Date of Patent: May 9, 2017

(54) IMAGE PICKUP METHOD AND PHOTOGRAPHING DEVICE

(71) Applicant: Kabushiki Kaisha TOPCON, Itabashi-ku, Tokyo-to (JP)

(72) Inventors: Fumio Ohtomo, Asaka (JP); Hitoshi Otani, Tokyo-to (JP); Tetsuji Anai, Tokyo-to (JP); Kaoru Kumagai, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 724 days.

(21) Appl. No.: 13/904,159

(22) Filed: May 29, 2013

(65) Prior Publication Data

US 2013/0321591 A1 Dec. 5, 2013

(30) Foreign Application Priority Data

May 29, 2012 (JP) ................................ 2012-121497

(51) Int. Cl.
  *H04N 13/02* (2006.01)
  *H04N 5/232* (2006.01)
  (Continued)

(52) U.S. Cl.
  CPC ......... *H04N 13/0275* (2013.01); *G01C 11/02* (2013.01); *G01C 11/06* (2013.01); *H04N 5/23222* (2013.01); *H04N 13/0221* (2013.01)

(58) Field of Classification Search
  CPC ............ H04N 5/23293; H04N 1/2112; H04N 5/2254; H04N 5/2256; H04N 5/23206;
  (Continued)

(56) References Cited

U.S. PATENT DOCUMENTS

| 7,451,060 B2 * | 11/2008 | Minami ................... G01C 7/02 382/284 |
| 7,508,442 B2 * | 3/2009 | Watanabe et al. ............ 348/360 |

(Continued)

FOREIGN PATENT DOCUMENTS

| JP | 2006-10376 A | 1/2006 |
| JP | 2007-171048 A | 7/2007 |
| JP | 2010-239564 A | 10/2010 |

*Primary Examiner* — Dave Czekaj
*Assistant Examiner* — Kehinde O Abimbola
(74) *Attorney, Agent, or Firm* — Nields, Lemack & Frame, LLC (57) ABSTRACT

A photographing device comprises an image pickup unit to acquire a moving image and a still image of an object, an image pickup control unit, an angle sensor, an image processing unit for extracting characteristic points from a first still image, tracking the characteristic points in the moving image, identifying the characteristic points in a newest image and selecting an orientation point common to the first still image and the newest image, a storage unit, a display unit, and an arithmetic unit. The arithmetic unit performs relative orientation between the first still image and the newest image based on the orientation point and on detection result of the angle sensor, obtains a distance H to the object and a distance B between points where the images have been photographed and performs guidance display where still images can be acquired sequentially when the B/H value reaches a predetermined value or higher.

6 Claims, 7 Drawing Sheets (51) Int. Cl.
*G01C 11/02* (2006.01)
*G01C 11/06* (2006.01)

(58) Field of Classification Search
CPC ... H04N 5/2355; G11B 5/70636; G11B 5/7022;
G11B 5/712; G11B 5/7021; G11B
5/7023; H01L 2924/0002; H01L 2924/00;
H01L 22/34; A61K 2039/5254; A61K
2039/5256
See application file for complete search history.

(56) References Cited

U.S. PATENT DOCUMENTS

| | | | |
|---|---|---|---|
| 7,552,025 B2 | 6/2009 | Ohtomo et al. | |
| 7,746,377 B2* | 6/2010 | Ito | G06T 7/0046 348/43 |
| 7,747,151 B2* | 6/2010 | Kochi | G01B 11/24 348/50 |
| 7,804,996 B2 | 9/2010 | Ohtomo et al. | |
| 8,422,857 B2* | 4/2013 | Kashima | G06T 11/60 386/241 |
| 2002/0047905 A1* | 4/2002 | Kinjo | G06K 9/00221 348/211.99 |
| 2004/0061782 A1* | 4/2004 | Kinjo | H04N 1/00281 348/207.1 |
| 2005/0151839 A1* | 7/2005 | Ito | G06T 7/0046 348/51 |
| 2005/0212948 A1* | 9/2005 | Watanabe et al. | 348/340 |
| 2005/0271264 A1* | 12/2005 | Ito | G06T 5/006 382/154 |
| 2007/0263924 A1* | 11/2007 | Kochi | G01B 11/24 382/154 |
| 2008/0065349 A1* | 3/2008 | Minami | G01C 7/02 702/158 |
| 2009/0184916 A1* | 7/2009 | Miyazaki | G09G 3/3406 345/102 |
| 2010/0007665 A1* | 1/2010 | Smith et al. | 345/473 |
| 2010/0013991 A1* | 1/2010 | Miyazaki | G09G 3/3406 348/452 |
| 2010/0034272 A1* | 2/2010 | Miyazaki | G09G 3/3406 375/240.16 |
| 2010/0111501 A1* | 5/2010 | Kashima | G06T 11/60 386/212 |
| 2011/0274318 A1* | 11/2011 | Shindo et al. | 382/115 |

* cited by examiner

IMAGE PICKUP METHOD AND PHOTOGRAPHING DEVICE

BACKGROUND OF THE INVENTION

The present invention relates to an image pickup method and a photographing device when a 3D model is prepared in the photogrammetry.

In general, when a 3D model is prepared in the photogrammetry, orientation is performed on two pickup images of an object to be measured, and three-dimensional measurement is performed thereafter. Therefore, it is necessary to have a predetermined overlapping amount so that the orientation can be performed on the two pickup images used in the photogrammetry.

When a photographer carries a camera and takes photograph of an object to be measured while the photographer is moving, the photographer takes photograph of the object to be measured while confirming the images to be picked up through a finder. Also, in order that the photogrammetry is carried out on an image already picked up, a distance between two image pickup points is also needed. In actual photographing operation, two photographing points are set up, and photographing is performed in such manner that a predetermined overlapping amount is set on the object to be measured at each point.

On the other hand, when the photographing operation is performed under such condition that the camera is carried at both points, an optical axis of the camera is unstable, and data on the direction of the optical axis, tilting of the optical axis (i.e. pitch and yaw), and twisting (roll) of the optical axis or the like are not known. Therefore, an adequate overlapping amount is needed to perform the orientation on both images. However, in order that an adequate overlapping amount is obtained, there is no other way but to rely on intuition or a sixth sense of the photographer, and whether or not the photographing has been performed adequately can not be confirmed until the orientation is performed on the image picked up.

Therefore, the photogrammetry by using a handheld type camera requires high skill and has not always been accomplished in very efficient operation.

SUMMARY OF THE INVENTION

It is an object of the present invention to accomplish the preparation of a 3D model in simple and convenient manner by using a portable type camera.

To attain the above object, an image pickup method according to the present invention comprises a step of moving while photographing a moving image of an object to be measured, a step of extracting characteristic points from a first image acquired, a step of performing image tracking on the characteristic points, a step of identifying the characteristic points from a newest second image, a step of selecting an orientation point from the characteristic points, a step of executing relative orientation between the first image and the second image based on the orientation point, and a step of performing guidance display of possible acquisition of still images sequentially at a moment when a value of B/H between a distance H to the object to be measured thus obtained and a distance B between photographing points where the first image and the second image have been photographed reaches a predetermined value or higher.

Also, the image pickup method according to the present invention further comprises a step of displaying photographing condition of the object to be measured on a display unit in real time and displaying the orientation points in different colors or by flashing display at a moment when the B/H value reaches a predetermined value or higher.

Further, the image pickup method according to the present invention further comprises a step of displaying photographing condition of the object to be measured on a display unit in real time and acquiring still images sequentially at a moment when the B/H value reaches a predetermined value or higher.

A photographing device according to the present invention comprises an image pickup unit capable to acquire a moving image and a still image of an object to be measured, an image pickup control unit for controlling acquisition of a moving image and a still image, an angle sensor for detecting at least a pitch angle, an image processing unit for extracting characteristic points from a first still image, for performing tracking of the characteristic points in regard to the moving image, and for identifying the characteristic points in a newest image and for selecting an orientation point common to the first still image and the newest image, a storage unit, a display unit for displaying the moving image and the still image, and an arithmetic unit, wherein the image pickup control unit picks up a moving image after acquiring the first still image, and wherein the arithmetic unit performs relative orientation between the first still image and the newest image based on the orientation point and on detection result of the angle sensor, obtains a distance H to the object to be measured and a distance B between photographing points where the first still image and the second still image have been photographed, obtains a B/H value, and performs guidance display of possible acquisition of still images sequentially at a moment when the B/H value reaches a predetermined value or higher.

Also, the photographing device according to the present invention wherein the arithmetic unit controls the image pickup control unit so as to acquire still images sequentially at a moment when the B/H value reaches a predetermined value or higher, and to store the result in the storage unit.

Further, in the photographing device according to the present invention, the guidance display displays the orientation points in different colors when the B/H value reaches a predetermined value or higher, or displays the orientation point in flashing.

Also, in the photographing device according to the present invention, the display unit has a horizontal photographing position display portion extending in horizontal direction and a vertical photographing position display portion extending in vertical direction, and a horizontal position and a vertical position where the still image has been acquired are displayed respectively on the horizontal photographing position display portion and the vertical photographing position display portion.

Further, in the photographing device according to the present invention, a horizontal position and a vertical position where a still image has been acquired are displayed respectively at the horizontal photographing position display portion and the vertical photographing position display portion, a display to indicate the present photographing position is displayed in real time, and flashing or color is changed on the display to indicate the present image pickup position at a moment when the B/H value of the image pickup position reaches the predetermined value or higher.

An image pickup method according to the present invention comprises a step of moving while photographing a moving image of an object to be measured, a step of extracting characteristic points from a first image acquired, a step of performing image tracking on the characteristic points, a step of identifying the characteristic points from a newest second image, a step of selecting an orientation point from the characteristic points, a step of executing relative orientation between the first image and the second image based on the orientation point, and a step of performing guidance display of possible acquisition of still images sequentially at a moment when a value of B/H between a distance H to the object to be measured thus obtained and a distance B between photographing points where the first image and the second image have been photographed reaches a predetermined value or higher. Therefore, a still image suitable for the photogrammetry can be reliably acquired, and it is possible to perform the measurement with predetermined measurement accuracy and with stable measurement accuracy.

Also, the image pickup method according to the present invention further comprises a step of displaying photographing condition of the object to be measured on a display unit in real time, and a step of displaying the orientation points in different colors or by flashing display at a moment when the B/H value reaches a predetermined value or higher. As a result, a position or the condition to acquire the still image becomes clear to the operator, and the working efficiency can be improved.

Further, the image pickup method according to the present invention further comprises a step of displaying photographing condition of the object to be measured on a display unit in real time, acquiring still images sequentially at a moment when the B/H value reaches a predetermined value or higher. As a result, a still image satisfying a predetermined accuracy can be reliably acquired.

Also, the photographing device according to the present invention comprises an image pickup unit capable to acquire a moving image and a still image of an object to be measured, an image pickup control unit for controlling acquisition of the moving image and the still image, an angle sensor for detecting at least a pitch angle, an image processing unit for extracting characteristic points from a first still image, for performing tracking of the characteristic points in regard to the moving image, and for identifying the characteristic points from a newest image, and for selecting an orientation point common to the first still image and the newest image, a storage unit, a display unit for displaying the moving image and the still image, and an arithmetic unit, wherein the image pickup control unit picks up a moving image after acquiring the first still image, and wherein the arithmetic unit performs relative orientation between the first still image and the newest image based on the orientation point and on detection result of the angle sensor, obtains a distance H to the object to be measured and a distance B between photographing points where the first still image and the second still image have been photographed, obtains a B/H value, and performs guidance display of possible acquisition of still images by arithmetic process with less burden sequentially at a moment when the B/H value reaches a predetermined value or higher. As a result, a still image suitable for the photogrammetry can be acquired in efficient and reliable manner, and measurement can be performed with predetermined measurement accuracy and with stable measurement accuracy. Further, relative orientation in the image tracking can be carried out in simple and easy manner because the result of detection by an angle sensor is used.

Further, the photographing device according to the present invention wherein the arithmetic unit controls the image pickup control unit so as to acquire still images sequentially at a moment when the B/H value reaches a predetermined value or higher, and to store the result in the storage unit. Thus, it is possible to reliably acquire a still image satisfying a predetermined accuracy.

Also, in the photographing device according to the present invention, the guidance display displays the orientation points in different colors or in flashing when the B/H value reaches a predetermined value or higher. As a result, in accordance with the guidance on the screen, a position or the condition to acquire the still image becomes clear to the operator, and the working efficiency can be improved.

Further, in the photographing device according to the present invention, the display unit has a horizontal photographing position display portion extending in horizontal direction and a vertical photographing position display portion extending in vertical direction, and a horizontal position and a vertical position where the still image has been acquired are displayed respectively on the horizontal photographing position display portion and the vertical photographing position display portion. As a result, the conditions to acquire the still image can be accurately defined, and the working efficiency can be improved. Also, the still image can be acquired efficiently, completely and adequately.

Also, in the photographing device according to the present invention, a horizontal position and a vertical position where a still image has been acquired are displayed respectively at the horizontal photographing position display portion and the vertical photographing position display portion, a display to indicate the present photographing position is displayed in real time, and flashing or color is changed on the display to indicate the present image pickup position at a moment when the B/H value of the image pickup position reaches the predetermined value or higher. As a result, the condition of the acquisition of the still image can be accurately identified and it can be definitely determined which of the still image at which position should be acquired.

DETAILED DESCRIPTION OF THE PREFERRED EMBODIMENT

By referring to the drawings, description will be given below on embodiments of the present invention.

Figure 1:
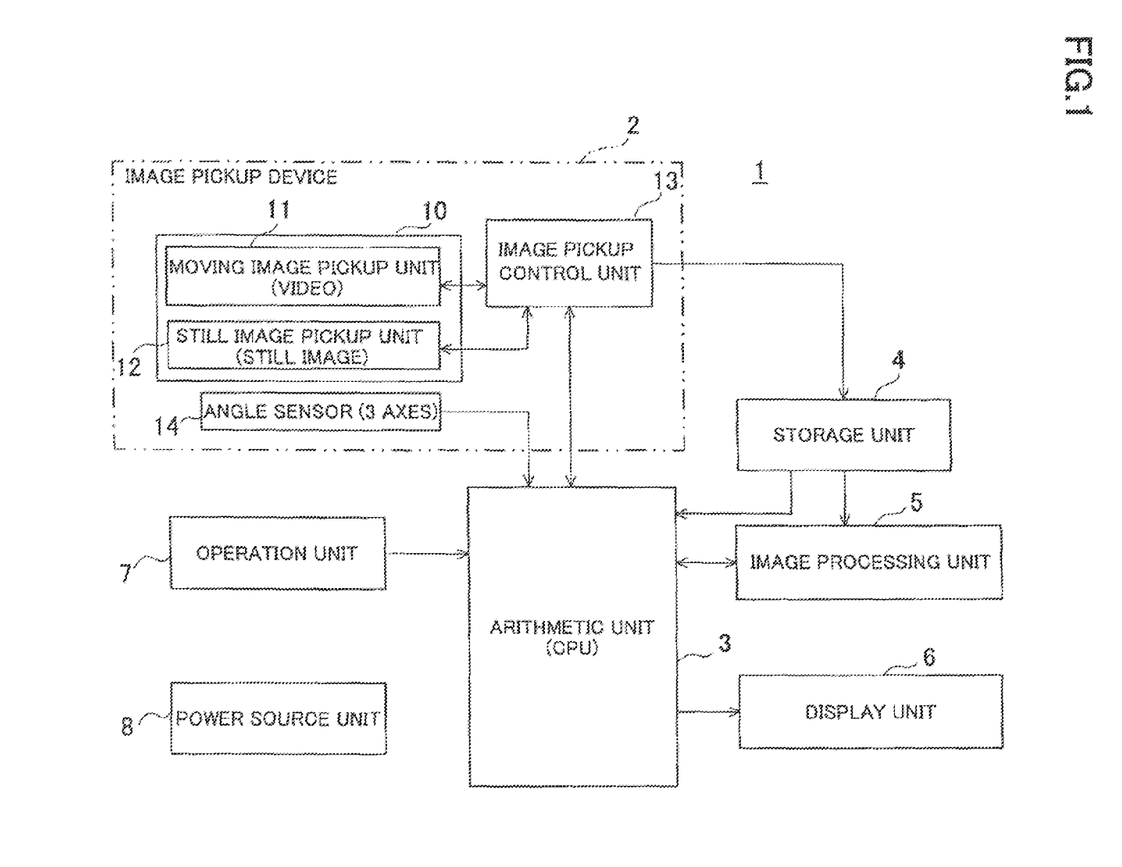
FIG. 1 is a schematical block diagram to show a photographing device according to an embodiment of the present invention.

First, description will be given on general features of a photographing device according to an embodiment of the present invention by referring to FIG. 1.

A photographing device 1 primarily consists of an image pickup device 2, an arithmetic unit (CPU) 3, a storage unit 4, an image processing unit 5, a display unit 6, an operation unit 7, a power source unit 8, etc.

Also, the image pickup device 2 comprises an image pickup unit 10, an image pickup control unit 13, and an angle sensor 14. Further, the image pickup unit 10 has a digital video camera as a moving image pickup unit 11 and a digital camera as a still image pickup unit 12.

The moving image pickup unit 11 has CCD and CMOS sensor having a multiple of pixels as image pickup element, and each pixel can specify positions on the image pickup element. The moving image pickup unit 11 acquires a moving image of an object to be measured or can pick up a still image of the object to be measured at a predetermined time interval, e.g. at a rate of 10 images/sec. similarly to the case of the moving image. It is so arranged that the moving image is outputted as digital moving image data from the image pickup element.

The still image pickup unit 12 has CCD or CMOS sensor having a multiple of pixels as image pickup element, and each pixel can specify positions on the image pickup element. The still image pickup unit 12 acquires a still image of high resolution of the object to be measured, and the still image pickup unit 12 is so arranged that the still image is outputted as digital still image data from the image pickup element of the still image pickup unit 12.

As the moving image pickup unit 11 and the still image pickup unit 12, one image pickup unit 10 may be used, which has both of video photographing function and still image photographing function. In the following, description will be given by referring to the moving image pickup unit 11 and the still image pickup unit 12 as a part of the image pickup unit 10.

The image pickup control unit 13 controls a changeover of moving image photographing by the moving image pickup unit 11 and still image photographing by the still image pickup unit 12. Also, the image pickup control unit 13 carries out control operation on photographing by the moving image pickup unit 11 and the still image pickup unit 12 such as on/off control of photographing by the moving image pickup unit 11, on/off control of photographing by the still image pickup unit 12, and synchronous control of moving image photographing by the moving image pickup unit 11 and still image photographing by the still image pickup unit 12.

Further, the image pickup control unit 13 arranges the moving image data and the still image data acquired respectively at the moving image pickup unit 11 and the still image pickup unit 12 in time series. Then, the image pickup control unit 13 associates the moving image data and the still image data with the time of acquisition and stores in the storage unit 4.

As the angle sensor 14, a gyro, an azimuth sensor, or the like is used. The angle sensor 14 detects posture of the image pickup device 2, i.e. tilting in three axial directions (i.e. roll, pitch and yaw), and outputs the results of detection to the arithmetic unit 3 and the image pickup control unit 13.

The image pickup control unit 13 acquires posture information from the angle sensor 14 by synchronizing with control signals to the moving image pickup unit 11 and the still image pickup unit 12. When the moving image data and the still image data are stored in the storage unit, the moving image and the still image are associated with posture information when the moving image and the still image are acquired respectively. The role of the image control unit 13 may be fulfilled by the arithmetic unit 3.

The angle sensor 14 detects angles in three axial directions (i.e. roll, pitch, and yaw) of the image pickup device 2. It will suffice if the angle sensor 14 can detect at least a pitch angle, i.e. an angle in horizontal direction, running perpendicularly to the image pickup direction, and an acceleration sensor is used, for instance.

As the storage unit 4, a semiconductor memory built in the image pickup device 2, or a removable type memory card, or any type of storage means such as HDD may be adopted. In the storage unit 4, a data storage region is prepared where various types of data are stored. Also, in the storage unit 4, a program storage region is prepared where various types of programs are stored.

In the data storage region, the following data and information are stored: the moving image data acquired at the moving image pickup unit 11, time of the acquisition of the moving image data (i.e. time of each of frame image data consisting of the moving image), posture information when the moving images are acquired (i.e. posture information for each of frame image data consisting of the moving image), and the still image data acquired by the still image pickup unit 12, time of acquisition of the still image data and posture information when the still images are acquired. Also, information of characteristic points of the object to be measured as extracted from the image, three-dimensional data of the object to be measured as obtained by photogrammetry and the like are stored in the data storage region.

The moving image data, the still image data, the time of acquisition of the image, and posture information at the moment of acquisition of the image are associated by the image pickup unit 13 or by the arithmetic unit 3 at the time of storage.

Various types of programs are stored in the program storage region, such as; an image pickup control program for controlling image pickup at the moving image pickup unit 11 and the still image pickup unit 12 at the image pickup control unit 13, an image processing program for extracting the characteristic points in regard to the object to be measured from two images, for selecting orientation point from the characteristic point and for performing image processing such as relative orientation of two images based on the orientation point, a measurement program for performing three-dimensional measurement (photogrammetry) of the object to be measured from two images on which relative orientation is performed, a judgment program for judging as to whether an image is suited as an image for photogrammetry, a tracking program for carrying out image tracking based on the moving image, a 3D model program for preparing a 3D model based on the result of the three-dimensional measurement, the image data as picked up and the like, and other programs.

The image processing unit 5 performs image processing according to the image processing program such that the image processing unit 5 extracts the characteristic points from the images picked up by the moving image pickup unit 11 and the still image pickup unit 12 and executes relative orientation of two images based on the characteristic points. The operation of the image processing unit 5 may be carried out by the arithmetic unit 3.

The display unit 6 displays the moving image picked up by the moving image pickup unit 11 in real time. Also, the display unit 6 displays the still images picked up by the still image pickup unit 12 and displays conditions of image pickup, displays condition of photographing and condition of collection of image data, displays tracking condition or carries out guidance display to show as to whether the pickup image is suitable as an image for photogrammetry or not. For the guidance display, various methods are adopted such as; whether the entire image should be flashed, whether color should be changed or not, whether sound or voice should be issued or not, or whether suitability of photographing should be displayed by providing a guidance display unit, and whether partial coloring display should be performed or not.

The operation unit 7 inputs an instruction to start or terminate photographing for the acquisition of an image by the image pickup device 2, or the operation unit 7 inputs condition when the measurement is carried out, and the like.

The power source unit 8 supplies electric power required by the image pickup device 2, the calculation unit 3, etc. Also, the power source unit 8 is preferably designed as a repeatedly chargeable type, or more preferably, designed as a rechargeable battery, which can be charged repeatedly. The power source unit 8 may also be designed as a replaceable battery.

First, in a case where the photogrammetry is carried out, two images of the object to be measured are required. It is also preferable that two images are overlapped on each other, and the object to be measured is included in common, and overlapping ratio of these two images is preferably 60% or more.

Now, referring to FIG. 2, description will be given on a relation between an object to be measured 22 and the image pickup device 2, and also, on measurement accuracy of the photogrammetry.

Figure 2:
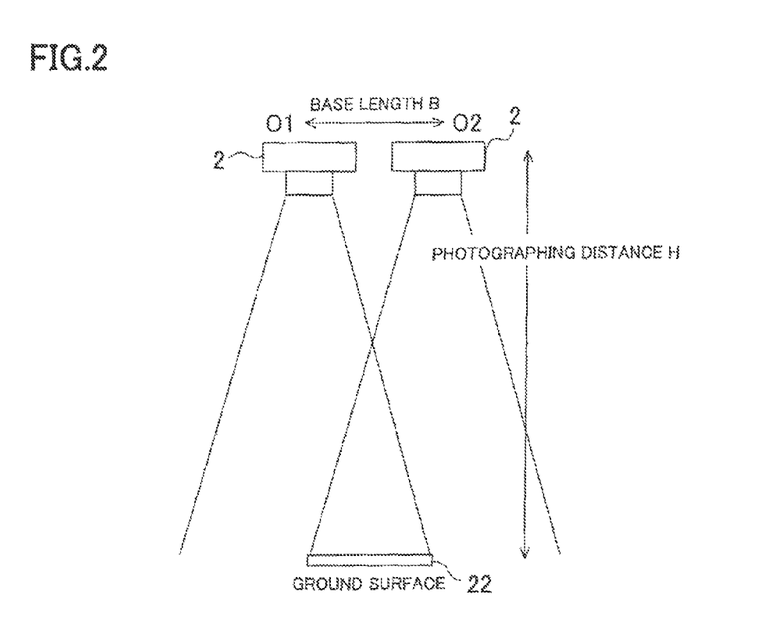
FIG. 2 is an explanatory drawing of measurement accuracy in a photogrammetry.

FIG. 2 shows that an image to be used in the photogrammetry is picked up at photographing points O1 and O2, and also, that the image is picked up at a photographing distance (height) H, photographing base length B, focal distance f of the camera, and pixel size $\Delta p$ of the camera. Also, FIG. 2 shows plane accuracy $\Delta xy$ and height accuracy $\Delta z$ under these conditions.

Plane accuracy $\Delta xy = H \times \Delta p / f$

Height accuracy $\Delta z = H \times H \times \Delta p / (B \times f)$

Here, each of the focal distance f and the pixel size $\Delta p$ is a constant, and measurement accuracy is determined by H and B. If the photographing distance H is higher, the measurement accuracy is decreased. If the photographing base length B is longer, the measurement accuracy is increased. Therefore, a predetermined value corresponding to the required measurement accuracy is taken as B/H (parallax). For instance, B/H is set as ⅓.

Figure 3:
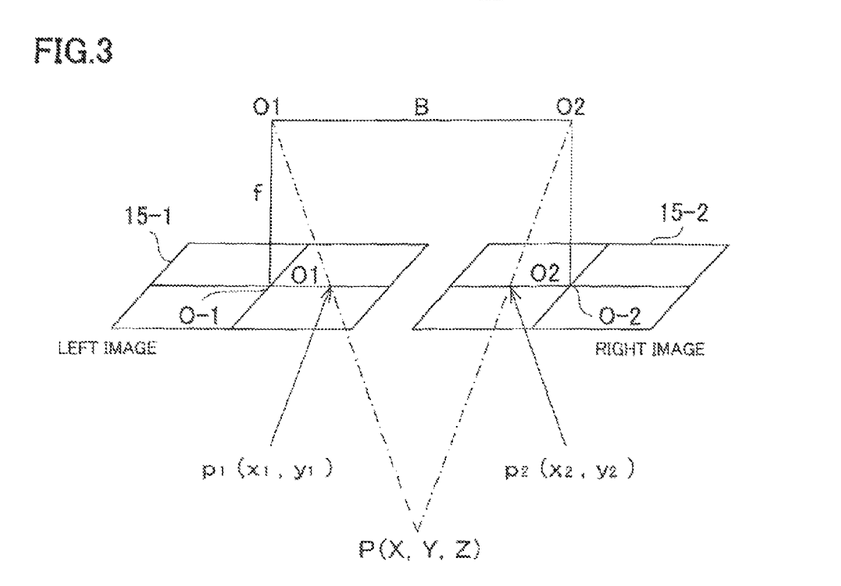
FIG. 3 is an explanatory drawing of a principle of the photogrammetry.

FIG. 3 shows a case where still images including a measurement point P are acquired at the photographing points O1 and O2 by the image pickup device 2. The photographing points O1 and O2 are separated each other by a photographing base length B. To simplify the explanation, it is supposed here that optical axes of the still image pickup unit 12 in a case where photographings are performed at the photographing points O1 and O2 run parallel to each other. Also, the image pickup device 2 has an image pickup element 15, and each of 15-1 and 15-2 in the figure shows an image pickup element respectively under the condition of an image pickup at the photographing points O1 and O2.

In FIG. 3, a triangle obtained by combining a triangle (O1, p1 and O-1) and a triangle (O2, p2 and O-2) has similarity to a triangle (O1, O2 and P). As a result, $$B/H = [p1(x1,y1) + p2(x2,y2)]/f.$$

Therefore, by detecting coordinates of a point p on the image acquired at the photographing points O1 and O2 respectively, i.e. on the image pickup element 15-p, B/H can be detected.

Figure 4:
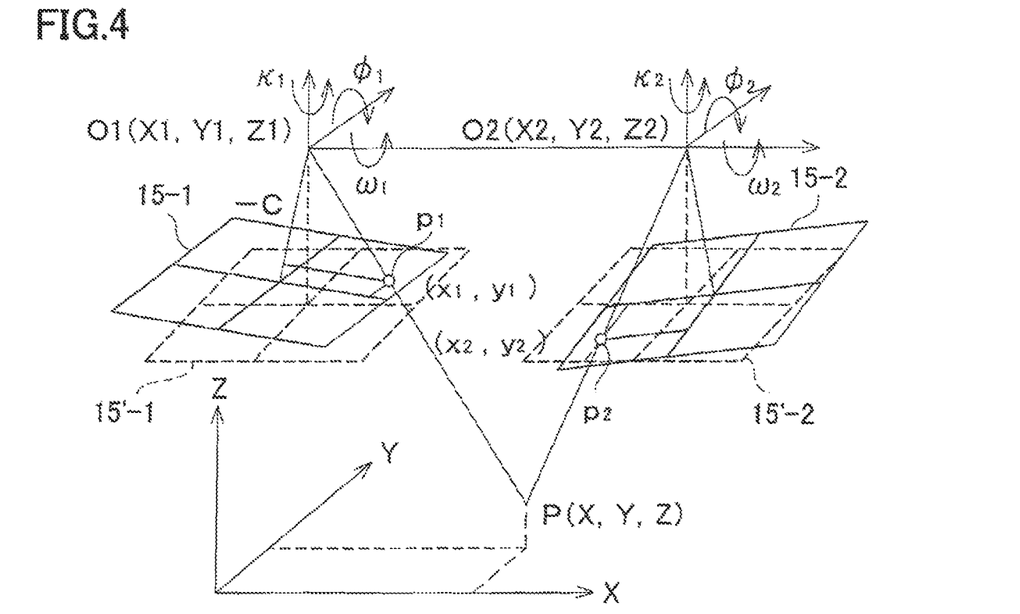
FIG. 4 is an explanatory drawing of relative orientation in the photogrammetry in a case where optical axes of two images are tilted.

Next, as shown in FIG. 4, in a case where the photograph is taken actually, the optical axis of the image pickup device 2 has tilting in three axial directions (i.e. roll angle $\omega$, pitch angle $\phi$, and yaw angle $\kappa$).

Therefore, if values of the roll angles $\omega 1$ and $\omega 2$, pitch angles $\phi 1$ and $\phi 2$ and yaw angles $\kappa 1$ and $\kappa 2$ are known, a coordinate value can be converted (relative orientation) to the coordinate value in a case where the optical axes of the images acquired at the photographing points O1 and O2 are set to run in parallel to each other by coordinate conversion, and the value of B/H can be obtained from the image pickup element 15.

In a case where the relative orientation is performed, at least five orientation points, each of which is a point common to an overlapping portion of two images, are needed. For the orientation point, characteristic points are extracted from the images. Then, image tracking is performed on the characteristic points, and the orientation point is selected from the characteristic points. As for the image tracking, it is disclosed in the Japanese Patent Publication Laid-open 2006-10376.

Coordinates of p1 and p2 in the converted coordinate system are as given below;

$X1 = x1 \cos\phi 1 \cdot \cos\kappa 1 - y1 \cos\phi 1 \cdot \sin\kappa 1 - f \sin\phi 1$ $Y1 = x1 \sin\kappa 1 - y1 \cos\kappa 1$ $Z1 = -x1 \sin\phi 1 \cdot \cos\kappa 1 - y1 \sin\phi 1 \cdot \sin\kappa 1 - f \cos\phi 1$ $X2 = x2 \cos\phi 2 \cdot \cos\kappa 2 - y2 \cos\phi 2 \cdot \sin\kappa 2 - f \sin\phi 2 + 1$ $Y2 = x2(\cos\omega 2 \sin\kappa 2 + \sin\omega 2 \cdot \sin\phi 2 \cos\kappa 2) + y2(\cos\omega 2 \cos\kappa 2 - \sin\omega 2 \cdot \sin\phi 2 \cdot \sin\kappa 2) + f \sin\omega 2 \cdot \cos\phi 2$ $Z2 = x2(\sin\omega 2 - \sin\kappa 2 - \cos\omega 2 \cdot \sin\phi 2 \cdot \cos\kappa 2) + y2(\sin\omega 2 \cdot \cos\kappa 2 + \cos\omega 2 \cdot \sin\phi 2 \cdot \sin\kappa 2) - f \cos\omega 2 \cdot \cos\phi 2$ Here, when B/H (parallax) is calculated, an angle where influence becomes at the highest is a pitch angle $\phi$, and it will suffice if the angle sensor 14 is such that at least pitch angle $\phi$ can be detected.

In a case where an image data is acquired by the photographing device 1, an object to be measured is photographed while moving. Now, by referring to FIG. 5, description will be given on a relationship between moving distance, near or long distance to the object to be measured, and B/H value.

Figure 5:
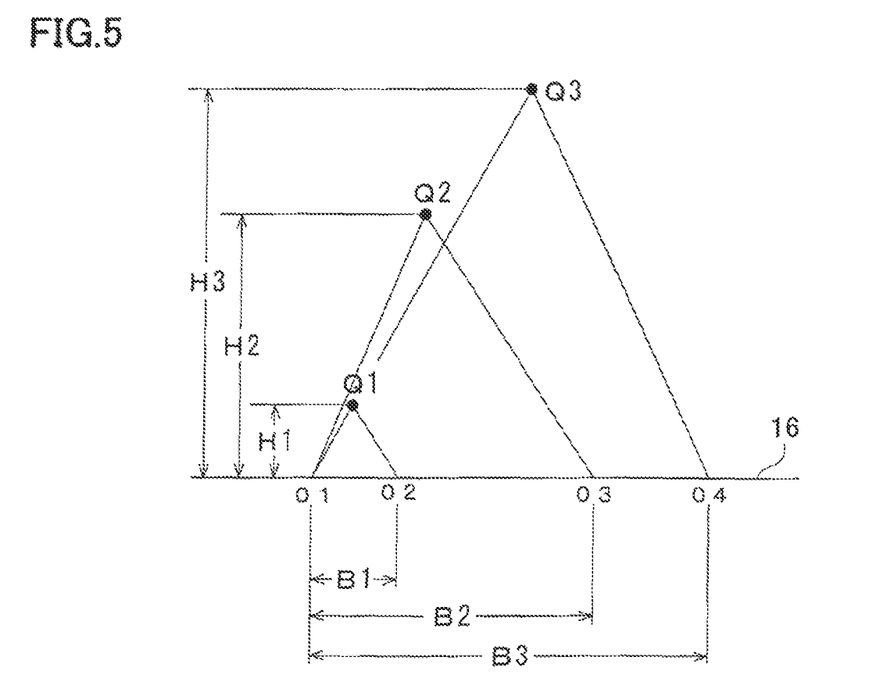
FIG. 5 is an explanatory drawing to show a relation of photograph acquiring position, an object to be measured, and B/H value.

It is supposed here that in FIG. 5, the photographing device 1 moves in rightward direction while picking up a moving image and picks up still images sequentially at photographing points O1, O2, O3, O4, . . . . Here, due consideration is given on measurement accuracy, and in a case where B/H≥$\alpha$ (where $\alpha$ is a constant corresponding to the measurement accuracy as desired), it is judged as a still image, which can be used for measurement.

With respect to a moving line 16 of the photographing device 1, it is supposed that measuring points located at a distance as required are Q1, Q2 and Q3 respectively and that distances between the measuring points Q1, Q2 and Q3 and the moving line 16 are H1, H2 and H3 respectively. Also, it is supposed that distances from a photographing point O1 to each of photographing points O2, O3 and O4 are B1, B2 and B3 respectively.

For the measurement points Q1, Q2 and Q3 when images are photographed at the photographing point O2; B1/H1≥α, B2/H2<α, and B3/H3<α. For the still image acquired at the photographing point O2, measurement can be performed only at the measurement point Q1.

Next, when an image is picked up at the photographing point O3, for the measurement points Q1, Q2 and Q3; B1/H1≥α, B2/H2≥α, and B3/H3<α. For the still image acquired at the photographing point O3, measurement can be performed at the measurement points Q1 and Q2.

Further, when an image is picked up at the photographing point O4 after moving to the photographing point O4, for the measurement points Q1, Q2 and Q3; B1/H1≥α, B2/H2≥α, and B3/H3≥α. For the still image acquired at the photographing point O4, measurement can be performed at the measurement points Q1, Q2 and Q3.

Therefore, by supposing that the value of α is a threshold value for any arbitrary measurement point and by notifying a measurement operator at the time when B/H≥α, the measurement operator can acquire a still image including a point to be measured with adequate moving amount. For the purpose of notification, the point to be measured is displayed on a display screen 17 (see FIG. 7), and visual notification can be given by changing the color, or by flashing of light for the point be measured where B/H≥α. Or, instead of visual notification or in addition to the visual notification, at a moment when B/H≥α, notification may be given by a buzzer and the like.

Or, it may be so arranged that the still image can be automatically acquired under the condition of B/H≥α.

Figure 7:
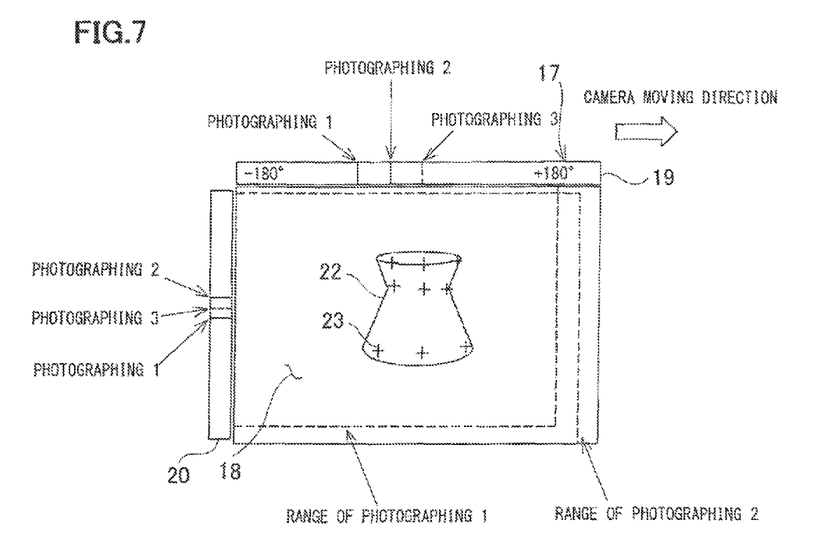
FIG. 7 is an explanatory drawing of an image acquired and a guidance display on a display unit.

FIG. 7 shows an example of the display screen 17 to be used in the present embodiment.

The display screen 17 has two or more display functions such as a function that an image picked up is displayed or a function that condition of pickup is displayed so that the display can be changed over for each display function or a part of the display can be assigned for each of the functions.

For instance, the display screen 17 as shown in FIG. 7 primarily has an image display unit 18, a horizontal photographing position display portion 19, and a vertical photographing position display portion 20.

On the image display unit 18, it is so arranged that a moving image photographed by the moving image pickup unit 11 is displayed, or a still image picked up by the still image pickup unit 12 is displayed.

The horizontal photographing position display portion 19 is a band-like display unit extending along an upper edge of the image display unit 18. On the horizontal photographing position display portion 19, an angle in horizontal direction, e.g. an angle of −180° to 180° is displayed, and a horizontal position (a horizontal angle) where the still image is picked up is sequentially displayed each as a vertical bar respectively. Also, a display of a position where a newest still image is acquired and a display of a position where the image has been acquired previously are displayed in different colors.

The vertical photographing position display portion 20 is a band-like display unit extending along a lateral edge (e.g. left lateral edge) of the image display unit 18. On the vertical photographing position display portion 20, a vertical position (a vertical angle) is sequentially displayed each as a horizontal bar. A position where the newest still image has been acquired and a position where the previous image has been acquired are displayed in different colors.

Figure 6:
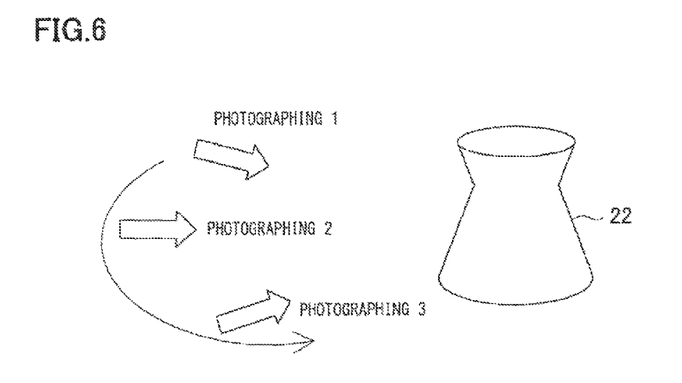
FIG. 6 is an explanatory drawing in a case where to measure a small object, an image is acquired by making a round over total circumference of a small object.
Figure 8:
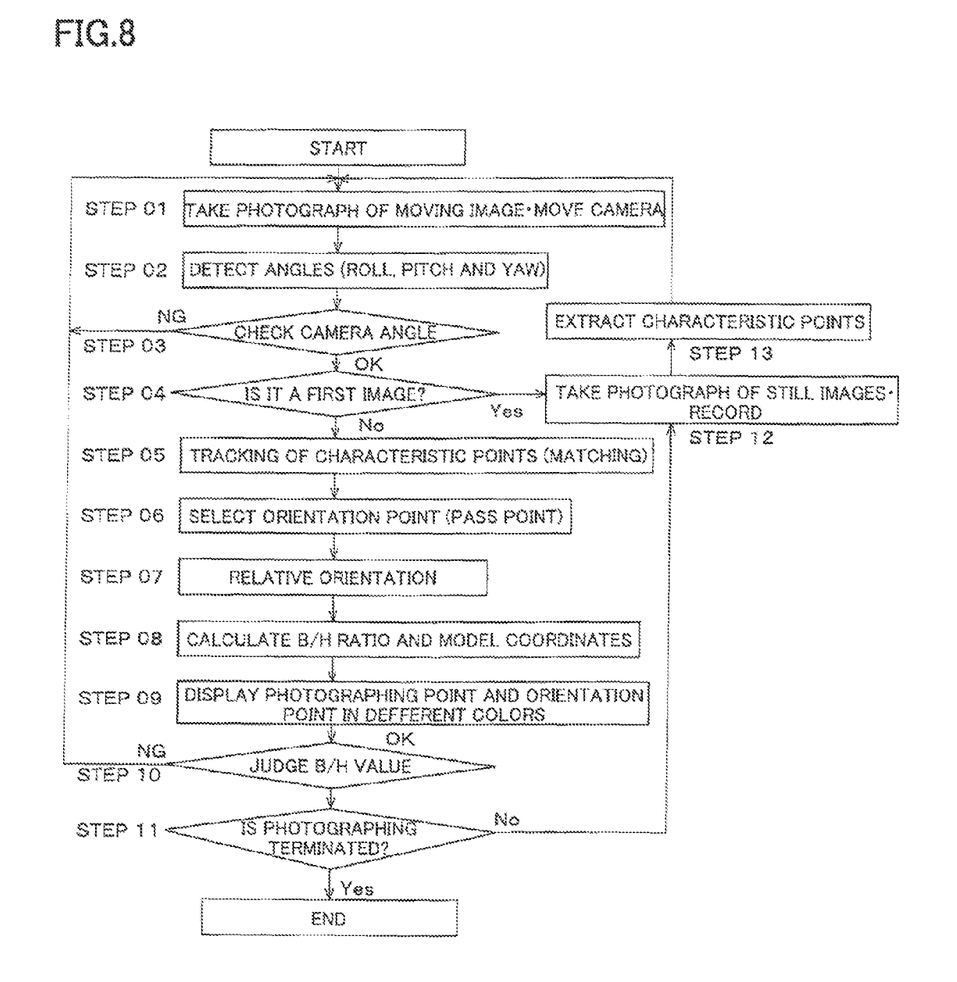
FIG. 8 is a flowchart to show operation of the present embodiment.

Now, by referring to FIG. 6 to FIG. 8, description will be given below on operation in the present embodiment.

In the following, description will be given on a case where an object to be measured 22 is a pot-like small object, and measurement is performed on the object to be measured 22 by making a round over total circumference of the object to be measured 22.

(Step 01) When the measurement is started, the first still image is acquired by photographing. A point where the first still image is picked up is a first photographing point (a photograph 1 in FIG. 7), and photographing by the moving image pickup unit 11 is started at the same time. Also, on the image display unit 18, a range where the still image has been acquired is displayed to correspond to the photographing position, and the acquisition of the still image is repeatedly performed. Then, a range acquired to correspond to the photographing position is displayed by overlapping.

(Step 02 and Step 03) Angles (roll, pitch and yaw) of the image pickup device 2 are detected, and it is judged whether the detected angles are within a predetermined range, i.e. in a condition where the still image can be acquired.

(Step 04 and Step 12) In a case where the detected angles are within the predetermined range, it is judged whether or not an image is a first image as photographed (hereinafter, referring simply as an image means an image for one frame within a moving image). If it is judged as the first image, the still image is photographed and is recorded.

(Step 13) On the still image thus photographed, characteristic points are extracted. Further, a moving image is photographed.

(Step 05) In a case where it is judged that the image is not the first image, image tracking is performed on the moving images photographed after the first still image on the characteristic points extracted from the still image. That is, tracking of the characteristic points is carried out by image matching between the images, which are adjacent to each other in terms of time.

(Step 06 and Step 07) Tracking is performed on the characteristic points, and the characteristic points are identified on a newest moving image (frame image, i.e. the newest image). Further, from the characteristic points existing in common on overlapping portion between a measurement starting image (i.e. an image at the moment when the tracking is started) and the newest image, an orientation point (a pass point) is selected, and based on the orientation point, relative orientation is performed between the measurement starting image and the newest image.

(Step 08) Based on two images obtained by relative orientation, coordinates on the orientation point are calculated. Then, measurement is performed on the object to be measured 22, and B/H ratio is calculated (see FIG. 3).

(Step 09) The calculation of relative orientation and the B/H ratio is carried out in real time while acquiring a new image. Therefore, the B/H ratio in regard to the object to be measured 22 is changed from moment to moment as a photographer moves, i.e. as the image pickup device 2 moves. The selected orientation point is displayed on the display unit 6 and is matched to the change of the B/H ratio, and color of the orientation point is changed. For instance, for the orientation point, when the B/H ratio has already exceeded a value at which 3D modeling can be performed (i.e. a threshold value), the orientation point is displayed in blue color. The orientation point is displayed in red color at the moment when the threshold value is satisfied, and displayed in green color when the threshold value is not satisfied.

(Step 10) It is judged whether the B/H value obtained is higher than a preset value (the threshold value) or not. If the B/H value is higher than the threshold value, it is judged that the conditions to acquire a next still image have been met. If it is judged that the conditions have been met, a display is turned to a display where 3D modeling can be made. For instance, when the display color is turned to red color and the display flashes, the photographer can confirm the display condition of the orientation point and can judge the optimal photographing position.

(Step 11) When the B/H value exceeds the threshold value for a new orientation point, a display is given, which notifies that the B/H value has exceeded the threshold value. The photographer judges whether a still image should be acquired or not on an object to be measured 22, for which the orientation point has been selected. In a case where the photographing is carried out continuously, a content displayed on the display unit 6 is confirmed, and the still image is acquired (Step 12). When it is in a condition where 3D modeling can be made, it may be so arranged that the still image is automatically acquired until an instruction to stop will be given.

In a case where the B/H value is lower than the threshold value, it goes back to Step 01, and the photographing of the moving image and the tracking of the characteristic points in regard to the moving image is continuously carried out.

The still image thus acquired (i.e. the newest image) is recorded, and the characteristic points are extracted on the newest image (Step 13). Further, the procedure of Step 01 to Step 10 such as tracking of the characteristic points, selection of the orientation point, etc. are repeatedly performed with the newest still image as reference.

When the still image has been acquired, horizontal position of the position of acquisition is displayed as a vertical bar on the horizontal photographing position display portion 19, and a vertical position is displayed as a horizontal bar on the vertical photographing position display portion 20. Accordingly, it can be visually judged as to in which direction the photographing has been made, and duplicated photographing and a lack of photographing can be prevented.

On the horizontal photographing position display portion 19 and the vertical photographing position display portion 20, a sighting direction at the present moment may be displayed at real time together with the position where the still image has been acquired. The sighting direction is moved together with the movement of the image pickup device 2, and the relation between the sighting direction and an object to be measured can be visually confirmed.

As described above, the acquisition (photographing) of the still image may be made manually by the photographer based on the result to be notified by notifying means such as color change, flashing of light, etc., or photographing may be made automatically by the image pickup device 2 based on the judgment of the B/H.

(Step 11) After the judgment of the B/H, if it is judged that photographing is to be terminated, the measurement is terminated.

Then, with respect to the object to be measured 22, the still image necessary for three-dimensional measurement is acquired by the image. In addition to the still image, the moving image picked up for the purpose of the image tracking may be stored. By storing the moving images, it is possible to acquire the data in a case where the condition of the extraction of the characteristic points is changed at the moment of data processing after the photographing and the condition to carry out image tracking is changed.

Further, by acquiring an image data to satisfy the B/H value and the orientation point with regard to the image data, the preparation of 3D model can be performed from the image data thus acquired or from the orientation point. The preparation of the 3D model may be performed by the photographing device 1 or may be separately prepared by PC.

Also, it may be so arranged that the image data necessary for the photographing device 1 is acquired and stored at the storage unit 4, and three-dimensional measurement of the object to be measured 22 or the preparation of the 3D model may be performed separately by PC or the like from the images stored, or the three-dimensional measurement of the object to be measured 22 may be carried out while acquiring the image by the photographing device 1. In this case, as shown in FIG. 7, a measurement point may be displayed on the image sequentially by a plot 23 or the like. Further, the measurement point still in the measurement operation or the newest measurement point and the measurement point after the completion of the measurement may be displayed in different colors.

In the above, description has been given on a case where measurement is made over total circumference of a specific type of the object to be measured and the 3D model is prepared for a single object to be measured. Description will be given below on a case where the measurement operator moves along a road and performs measurement on an object to be measured, which exists along the route.

Figure 9:
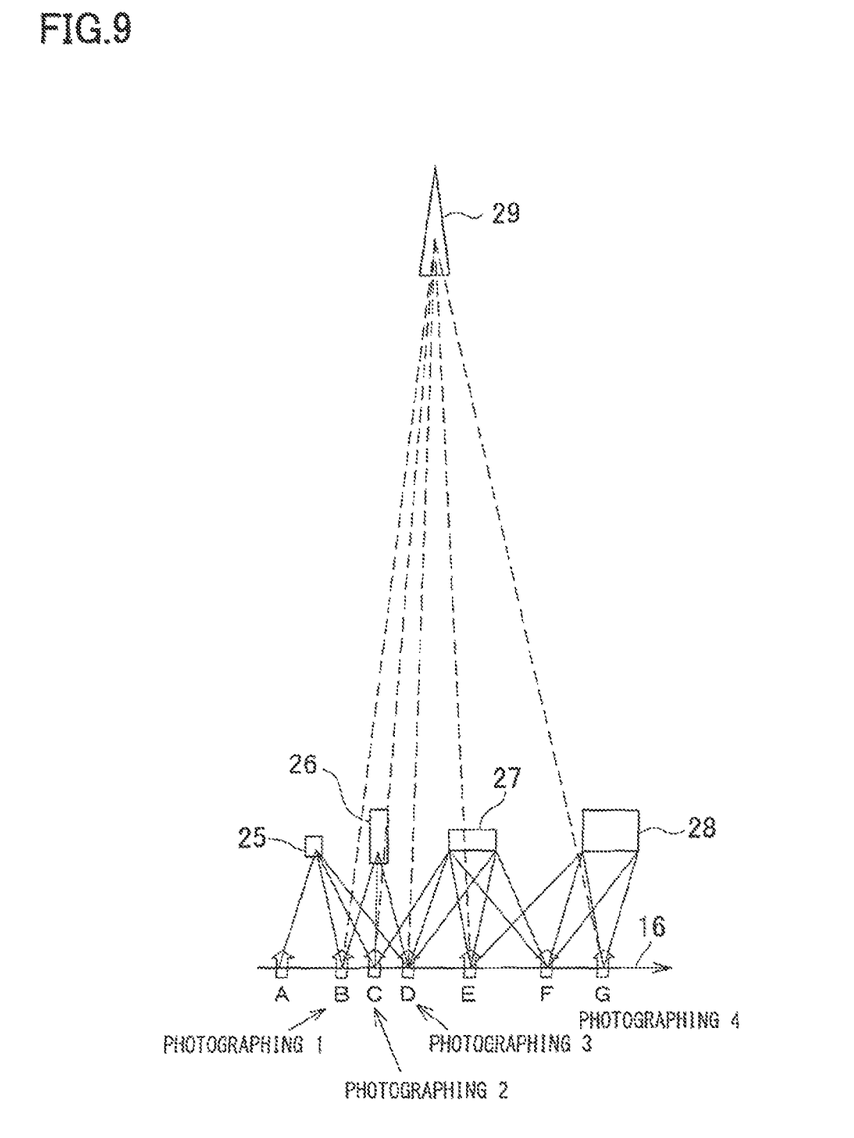
FIG. 9 is a schematical drawing to show a case where the measurement is performed on an object to be measured along a route.

FIG. 9 is a schematical drawing to show a relation between the photographing point and the object to be measured when it is moved from left to right with respect to paper surface. Objects to be measured 25, 26, 27 and 28 are present along a route and are at positions at short distance from a moving line 16, and an object to be measured 29 is present at a position separated by a long distance from the moving line 16. Also, FIG. 9 shows that, when it is moved along the moving line 16 while watching a guidance display, a still image is acquired at photographing points A, B, C, D, E, F and G where it is judged as adequate in the guidance display. Then, photographing 1, 2, 3 and 4 are performed at the points B, C, D and G respectively and a still image has been acquired in each case.

Figure 10A:
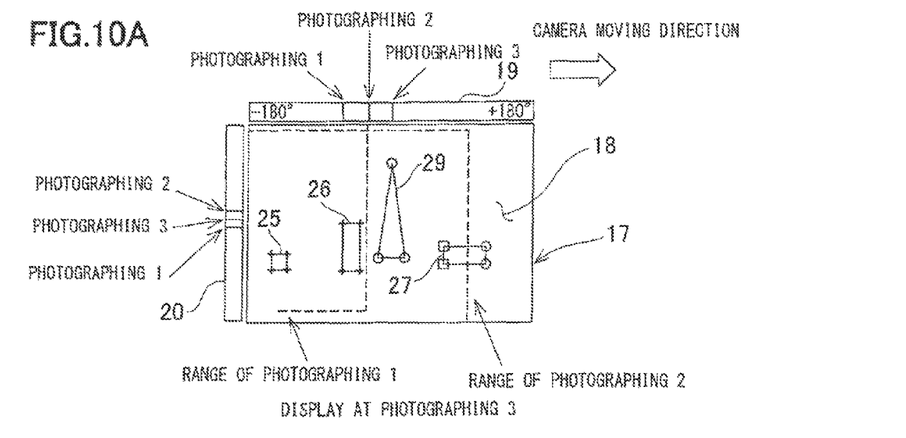
FIG. 10A is an explanatory drawing of images at each of photographing points in a case where the images are photographed while moving along a moving line.

FIG. 10A shows a display screen in the photographing 3, and the objects to be measured 25, 26, 29 and 27 are included in the images. Each range of the images in the photographing 1 and the photographing 2 is shown by broken lines.

For the still images acquired, characteristic points (selected as orientation points in the figure) are displayed by putting on the object to be measured. As described above, the conditions of the photographing are reflected on the orientation point in real time and display color is changed according to the value of B/H. In the figure, the orientation points are indicated by plotting of +, □ and ○. Actually, however, the orientation points are displayed depending on each color, and the mark + is displayed in blue color, the mark □ is displayed in red color, and the mark ○ is displayed in green color, for instance. For the plot marked with +, it is indicated that the value of B/H sufficiently exceeds the threshold value. For the plot □, it is indicated that the value of B/H nearly reaches the threshold value so that the 3D modeling is possible, and for the plot ◯, the condition where the 3D modeling is not possible is indicated.

When the image pickup device 2 moves along the moving line 16, a photographing base length B is changed. At the point of the photographing 3, the value of B/H exceeds the threshold value for all orientation points for the objects to be measured 25 and 26, and the 3D modeling becomes possible, and the orientation points of a part of the object to be measured 27 are turned to the condition where the 3D modeling is possible. Also, for the orientation points of the object to be measured 29 and for the orientation points of a part of the object to be measured 27, it is indicated that the 3D modeling is not possible.

Further, when it is turned to the condition of the photographing 4 after moving (FIG. 10B), a part of the object to be measured 29 and the object to be measured 28 are displayed on the image display unit 18. Thus, the orientation points of the object to be measured 29 are in the condition where the 3D modeling is possible, and it is indicated that a part of the orientation points of the object to be measured 28 are now in the condition where the 3D modeling is possible.

Figure 10B:
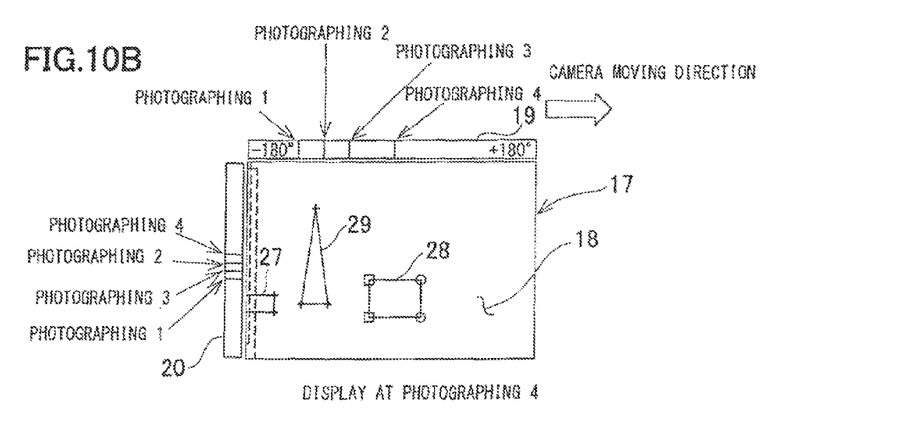
FIG. 10B is an explanatory drawing in a case where photographing is performed while moving further.

Therefore, regardless of whether the object to be measured is at near distance or at long distance with respect to the moving line 16, it can be judged from the screen that it is turned to the condition where the 3D modeling is possible. Accordingly, in either case where the object to be measured is at near distance or the case where an object to be measured is at long distance, an image to satisfy accuracy as desired can be acquired at an adequate position.

The invention claimed is:

1. An image pickup method; comprising: moving while photographing a moving image of an object to be measured; extracting characteristic points from a first image acquired; performing image tracking on said characteristic points; identifying said characteristic points from a newest second image; selecting an orientation point from said characteristic points; executing relative orientation between said first image and said second image based on said orientation point; displaying photographing condition of said object to be measured on a display unit in real time and display said orientation points in different colors or by flashing display at a moment when a value of B/H reaches a predetermined value or higher, wherein H is a distance to said object to be measured thus obtained and B is a distance between photographing points where said first image and said second image have been photographed and said B/H value is calculated while moving.

2. An image pickup method according to claim 1, further comprising acquiring still images sequentially at a moment when said B/H value reaches a predetermined value or higher.

3. A photographing device, comprising: an image pickup unit capable to acquire a moving image and a still image of an object to be measured; an image pickup control unit for controlling acquisition of a moving image and a still image; an angle sensor for detecting at least a pitch angle; an image processing unit for extracting characteristic points from a first still image, for performing tracking of said characteristic points in regard to said moving image, and for identifying said characteristic points in a newest image and for selecting an orientation point common to said first still image and said newest image; a storage unit; a display unit for displaying said moving image and said still image; and an arithmetic unit, wherein said image pickup control unit picks up a moving image after acquiring said first still image while moving, and wherein said arithmetic unit performs relative orientation between said first still image and said newest image based on the orientation point and on detection result of said angle sensor, obtains a distance H to said object to be measured and a distance B between photographing points where said first still image and said second still image have been photographed, obtains a B/H value while moving, and displays said orientation points in different colors, or displays said orientation point in flashing at a moment when said B/H value reaches a predetermined value or higher.

4. A photographing device according to claim 3, wherein said arithmetic unit controls said image pickup control unit so as to acquire still images sequentially at a moment when said B/H value reaches a predetermined value or higher, and to store the result in said storage unit.

5. A photographing device according to claim 3, wherein said display unit comprises a horizontal photographing position display portion extending in horizontal direction and a vertical photographing position display portion extending in vertical direction, and a horizontal position and a vertical position where said still image has been acquired are displayed respectively on said horizontal photographing position display portion and said vertical photographing position display portion.

6. A photographing device according to claim 5, wherein a horizontal position and a vertical position where a still image has been acquired are displayed respectively at said horizontal photographing position display portion and said vertical photographing position display portion, a display to indicate the present photographing position is displayed in real time, and flashing or color is changed on the display to indicate the present image pickup position at a moment when said B/H value of said image pickup position reaches the predetermined value or higher.

* * * * *